Sept. 1, 1936.　　　　A. T. JESTER　　　　2,052,978

VOLTAGE CONTROL FOR RECTIFIER CIRCUITS

Filed July 8, 1935

Inventor:
Alfred T. Jester
By:
Zabel Carlson & Wells
Attys.

Patented Sept. 1, 1936

2,052,978

UNITED STATES PATENT OFFICE 2,052,978

VOLTAGE CONTROL FOR RECTIFIER CIRCUITS

Alfred T. Jester, Houston, Tex.

Application July 8, 1935, Serial No. 30,284

3 Claims. (Cl. 175—363)

This invention relates to a voltage control device for rectifier circuits and more particularly to a saturable core method of control for the purpose of maintaining the output voltage of the rectifier substantially constant over a wide range of loads from no load to an excessive overload such as is oftentimes encountered in operating telegraph apparatus.

It is the purpose of this invention to provide means whereby the increase in load in output circuit of a rectifier may be utilized to cause a greater current flow in the input circuit to the rectifier and at the same time keep down the objectionable alternating current components in the output of the rectifier.

I will describe the preferred form of the invention by reference to the accompanying drawing wherein—

Figure 1:
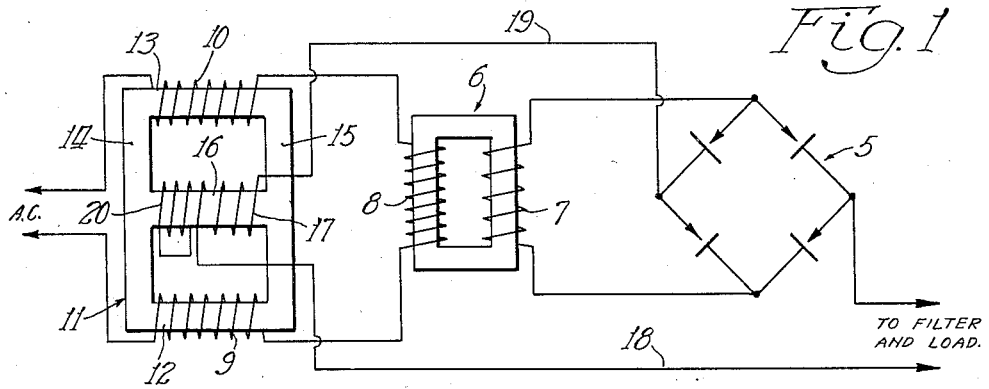
Fig. 1 is a wiring diagram illustrating the application of the invention to one type of rectifier.

Referring now in detail to the drawing, I show the invention applied in Fig. 1 to a bridge type rectifier 5. This rectifier receives its current from a transformer 6 having its secondary winding 7 connected across the rectifier and having its primary winding 8 connected between two coils 9 and 10 of the voltage regulating device 11. The opposite sides of an alternating current source are connected to the coils 9 and 10. It is an essential feature of the invention, however, to connect the primary coil 8 of transformer 6 between coils 9 and 10 of the voltage regulating device 11 since this provides a much higher efficiency than mere connection of the primary 8 in series with coils 9 and 10 which are then connected directly to each other. This advantage will be more clearly explained hereinafter upon completion of the explanation of the circuit.

The voltage control device 11 has a core consisting of the legs 12 and 13 upon which coils 9 and 10 are wound, connecting yokes 14 and 15 and a center leg 16. This core may be made up of suitable laminations, and windings 9 and 10 are so wound as to prevent normally any flux flowing through the leg 16 which would induce an alternating current in a coil 17 wound thereon. Coil 17 is connected in circuit with the load on rectifier 5 by means of conductors 18 and 19. Thus any current flowing in the output circuit of the rectifier, must pass through coil 17.

With alternating current supplied to the primary of transformer 6 through the voltage regulating device 11 and no load upon the output of the rectifier, the full permeability of the core of the device 11 is available for magnetic flux opposing current flowing through the coils 9 and 10, thus setting the no load voltage of the rectifier.

Now as the load is applied to the output of the rectifier, an increasing amount of current will flow through the coil 17 thus tending to saturate the core of the device 11 and to reduce its impedance to the flow of current through the coils 9 and 10. I find that with the coils 9 and 10 connected to opposite ends of the input coil 8 of transformer 6, it is possible to maintain the output voltage of the rectifier constant to a point of about 100% overload. Whereas, if the two coils 9 and 10 are connected directly to each other and in series with the coil 8, the voltage starts to drop off at about full load for the rectifier.

Figure 3:
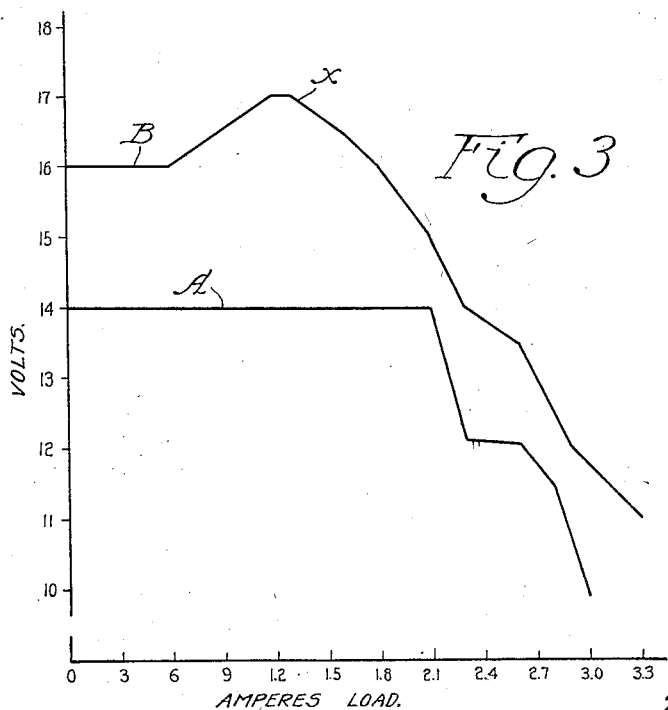
Fig. 3 illustrates the changes accomplished in the voltage output of the rectifier by the application of the invention thereto.

I find that I may further increase the voltage regulation of the device 11 by the addition of coil 20 to the leg 16 and short circuiting or closing this coil. This coil is composed of a very few turns and may consist of a single copper band placed around the leg 16 of the core. With this coil added and no other change made in the circuit, the output voltage of the rectifier under different degrees of load was changed as indicated in the curves plotted in Fig. 3. In the curves shown in Fig. 3, the curve A was taken with the voltage regulating device 11 in circuit as shown in Fig. 1, but with the coil 20 removed. The windings were of the proper values for 8, 9, and 10 to give a straight line voltage regulation, and, as shown, the voltage remained at 14 volts for an overload of approximately 100%. Without changing windings 8, 9, 10, and 17 in the least, winding 20 was added and short circuited as hereinbefore described and the resulting voltage was obtained as shown in curve B showing a considerable increase in voltage.

It is found that by giving the proper values to the windings 8, 9, 10, and 17, a straight line voltage at 14 volts up to a 200% overload could be obtained thus avoiding the hump indicated at X in curve B.

In addition to the increased current output obtained with this circuit arrangement, it was found that the alternating current component in the output circuit of the rectifier 5 was greatly reduced by the use of the coil 20 thus producing a much smoother direct current supply which is of great importance in telephone operation where the device is used for telephone circuits. It appears that the addition of the coil D makes the voltage regulating device operate somewhat as a choke in the output circuit of the rectifier to smooth out the direct current output from the rectifier.

Figure 2:
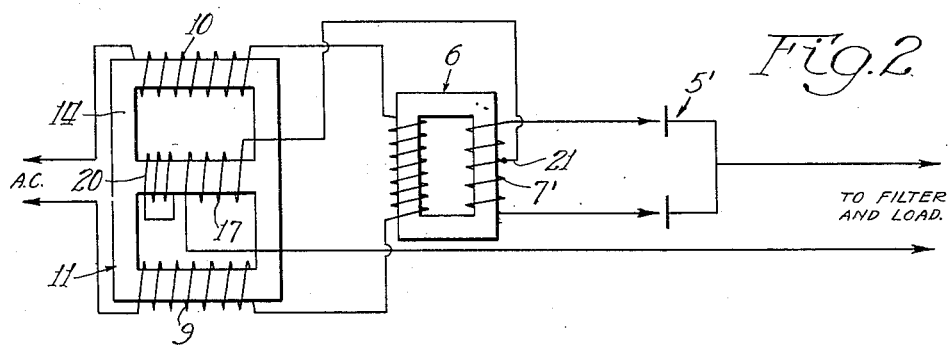
Fig. 2 illustrates the application of the invention to another type of rectifier.

The structure shown in Fig. 2 is substantially identical with that shown in Fig. 1 except that in this case a different type of rectifier 5' is shown, and coil 17 is connected to a center tap 21 on the secondary 7' of transformer 6.

From the above description, it is believed that the construction and advantages of this device will be readily apparent to those skilled in this art. It is also apparent that various modifications may be made without departing from the scope of the invention as defined by the claims.

Having thus described my invention, what I claim as new and desire to secure by Letters Patent is:

1. In combination with a rectifier, an alternating current supply circuit, and a direct current load circuit, a transformer having a secondary connected to said rectifier and having a primary winding in the alternating current supply circuit, a regulator comprising a magnetic core having end legs joined by yokes and an intermediate leg connecting said yokes, a coil on said intermediate leg and connected in series with the load in said load circuit, a second closed coil on said intermediate leg, coils on said end legs connected to the opposite terminals of said primary winding and to the alternating current supply circuit whereby to connect said winding in series with and between said last named coils, said last named coils being so wound as to prevent the introduction of alternating current in the first named coil.

2. In combination with a rectifier, an alternating current supply circuit, and a direct current load circuit, a transformer having a secondary connected to said rectifier and having a primary winding in the alternating current supply circuit, a regulator comprising a magnetic core having end legs joined by yokes and an intermediate leg connecting said yokes, a coil on said intermediate leg and connected in series with the load in said load circuit, coils on said end legs connected to the opposite terminals of said primary winding and to the alternating current supply circuit whereby to connect said winding in series with and between said last named coils, said last named coils being so wound as to prevent the introduction of alternating current in the first named coil, and a coil around said intermediate leg, said coil being short circuited.

3. A regulator for rectifiers comprising a magnetic core having end legs and an intermediate leg connected by yokes across their ends, coils on each of said end legs connected in series with the input circuit of the rectifier and receiving alternating current therefrom, a coil on the intermediate leg connected in series with the output circuit of the rectifier, said two first named coils being so wound as to prevent their inducing alternating current in said last named coil, and a second coil on said intermediate leg having its terminals connected to each other to provide a closed circuit.

ALFRED T. JESTER.